(12) United States Patent
Larson

(10) Patent No.: US 7,828,636 B2
(45) Date of Patent: Nov. 9, 2010

(54) METHOD AND SYSTEM FOR WASHING INTESTINES

(75) Inventor: LaWayne Larson, Fort Collins, CO (US)

(73) Assignee: JBS Swift & Company, Greeley, CO (US)

( * ) Notice: Subject to any disclaimer, the term of this patent is extended or adjusted under 35 U.S.C. 154(b) by 0 days.

(21) Appl. No.: 12/058,195

(22) Filed: Mar. 28, 2008

(65) Prior Publication Data

US 2008/0242206 A1     Oct. 2, 2008

Related U.S. Application Data

(60) Provisional application No. 60/908,821, filed on Mar. 29, 2007.

(51) Int. Cl.
*A22C 17/16* (2006.01)
(52) U.S. Cl. ........................................ 452/123; 452/173
(58) Field of Classification Search .................. 452/123, 452/173

See application file for complete search history.

(56) References Cited

U.S. PATENT DOCUMENTS 1,484,741 A    2/1924    Schönland, Jr.

(Continued)

FOREIGN PATENT DOCUMENTS

AU            52048         8/1974

(Continued)

OTHER PUBLICATIONS

International Search Report for International (PCT) Patent Application No. PCT/US08/58694, mailed Aug. 8, 2008.

(Continued)

*Primary Examiner*—David J Parsley
(74) *Attorney, Agent, or Firm*—Sheridan Ross P.C.

(57) ABSTRACT

Methods, devices, and systems are provided for washing an animal intestine. The device may include one or more flushing arms connected to a rotating fluid tank. The rotating fluid tank provides the fluid to the flushing arms, which in turn provide the fluid to the animal intestine. The rotating fluid tank may be adapted to rotate about a substantially vertical axis and during such rotation moves the flushing arms through a number of working sections around the washing machine.

22 Claims, 12 Drawing Sheets

U.S. PATENT DOCUMENTS

| | | | |
|---|---|---|---|
| 2,119,311 A * | 5/1938 | Biedermann | 452/123 |
| 3,509,593 A | 5/1970 | De Moss | |
| 3,594,856 A | 7/1971 | Michl | |
| 3,737,105 A | 6/1973 | Arnold et al. | |
| 3,803,669 A | 4/1974 | Dillon | |
| 3,958,304 A * | 5/1976 | Barbee | 452/123 |
| 4,106,161 A * | 8/1978 | Niccolls | 452/106 |
| 4,157,717 A | 6/1979 | Goldberg | |
| 4,216,910 A | 8/1980 | Kimbrough | |
| 4,293,980 A | 10/1981 | Ward | |
| 4,306,334 A | 12/1981 | Niedecker | |
| 4,565,324 A | 1/1986 | Rebula et al. | |
| 4,682,979 A | 7/1987 | Girouard | |
| 4,876,767 A | 10/1989 | Harben, III et al. | |
| 4,899,421 A | 2/1990 | Van Der Eerden | |
| 4,911,704 A | 3/1990 | Dixon | |
| 4,965,911 A | 10/1990 | Davey | |
| 5,120,266 A | 6/1992 | Aubert | |
| 5,569,067 A | 10/1996 | Meyn | |
| 5,616,073 A | 4/1997 | Curry et al. | |
| 5,820,453 A | 10/1998 | Burke | |
| 5,882,253 A | 3/1999 | Mostoller | |
| 6,083,096 A | 7/2000 | Carrillo | |
| 6,093,093 A | 7/2000 | Mostoller et al. | |
| 6,142,861 A | 11/2000 | Buhot et al. | |
| 6,146,263 A * | 11/2000 | Mostoller et al. | 452/173 |
| 6,168,511 B1 * | 1/2001 | Amstrup | 452/173 |
| 6,213,864 B1 | 4/2001 | Griffiths et al. | |
| 6,315,654 B1 | 11/2001 | Levsen | |
| 6,468,145 B1 | 10/2002 | Houtz et al. | |
| 6,641,475 B1 | 11/2003 | Nielsen et al. | |
| 6,685,550 B2 | 2/2004 | Houtz et al. | |
| 6,692,344 B2 | 2/2004 | Burke | |
| 6,840,923 B1 | 1/2005 | Lapcevic | |
| 7,261,628 B2 * | 8/2007 | Levsen | 452/123 |
| 2003/0036682 A1 | 2/2003 | Leber et al. | |

FOREIGN PATENT DOCUMENTS

| | | |
|---|---|---|
| CA | 2097759 | 12/1993 |
| EP | 0441829 | 8/1991 |
| EP | 1538917 | 6/2005 |
| JP | 2000-300165 | 10/2000 |
| JP | 2001-112408 | 4/2001 |
| JP | 2001-352897 | 12/2001 |
| JP | 2002-058418 | 2/2002 |
| JP | 2003-339305 | 12/2003 |
| JP | 2004-261069 | 9/2004 |
| JP | 2004-350617 | 12/2004 |

OTHER PUBLICATIONS

Written Opinion for International (PCT) Patent Application No. PCT/US08/58694, mailed Aug. 8, 2008.

* cited by examiner

METHOD AND SYSTEM FOR WASHING INTESTINES

CROSS REFERENCE TO RELATED APPLICATION

The present application claims the benefits of U.S. Provisional Patent Application Ser. No. 60/908,821 filed Mar. 29, 2007, to Larson, which is incorporated herein by this reference.

FIELD

The present invention generally relates to systems and methods for cleaning interior and/or exterior surfaces of an animal intestine.

BACKGROUND

During the processing of animals for human consumption, the primary meat and meat products are derived from the animal's skeletal muscles. That is, the meat products generally prepared for human consumption come from muscles that are attached to the skeleton of the animal and function to facilitate movement and support the weight of the animal. A number of other parts of the carcass are either consumed directly by people or used in the production of other foods. These other portions of the carcass are often referred to as "offal." There are a number of types of animals that can be processed for consumption. Examples of such animals include beef or bovine (e.g., cattle, steers, heifers, cows, bulls, and buffalo), pork or porcine (e.g., sows, gilts, barrows, boars, and pigs), and ovine (e.g., sheep and lamb).

The technology used to process the skeletal muscles of such animals is relatively advanced compared to the technology used to process the offal. Most technology used to process skeletal muscles is directed toward increasing quality and operational efficiency. Many technologies have been developed that can systematically perform tasks previously performed by multiple human workers. The use of such technologies increases the throughput of the production facility as well as reducing the amount of human error. This ultimately results in a decrease in costs to the producer, which can be passed on as cost savings to the consumer.

The technology employed to process offal has not been advanced in the way that technology has been advanced for the processing of the rest of the animal carcass. There is a significant market for offal and thus the implementation of technologies to increase efficiency in its production would be beneficial. Various technologies that have been contemplated for use in processing offal are not feasible to implement in existing meat production facilities due to, for example, their size and the limited space in such facilities. Since newer technologies have generally not been implemented in the production of offal, most meat production facilities still rely mainly on human labor to process offal, especially when it comprises intestines.

The current process employed by most meat production facilities to process intestines requires the coordinated effort of between about 10-20 employees. The intestine is a generally soft, tubular element, which extends from the stomach to the anus. The small intestines of various animals vary in length from about 15 feet to about 120 feet. The small intestines of cattle, for example, typically extend between about 80 feet to about 120 feet, with more typical lengths being between about 100 feet and 110 feet. Small intestines of hogs typically extend between about 15 and 18 feet. The intestines (whether from a bovine, porcine, or ovine) are typically extracted from the carcass of the dead animal during the slaughtering process. When extracted, the intestines generally remain attached to the mesentery and are disposed in a sinuous configuration. The intestines typically have connective tissue, fat tissue, and glands attached to an exterior surface, all of which must be removed prior to human consumption.

In a live red-meat animal, the intestines receive food (also referred to as "ingesta") from the stomach, which is passed along the length of the intestine so that nutritional components of the food can be absorbed into the animal's blood stream. The unabsorbed portion of the food is discharged from a distal end of the intestine as digesta or fecal matter. Intestines that are harvested from the carcasses of red-meat animals during slaughtering contain some amount of digesta or fecal matter, which must be removed prior to human consumption.

Some technologies employ a carrier for holding and transporting sections of an intestine above an operator. Such technologies are cumbersome in their size and the fact each carrier has to be brought to the water supply. Due to the size of such a machine it is not feasible for introduction into currently existing meat production facilities.

The prior art systems and methods for cleaning animal intestines are labor-intensive, space consuming, and require much human intervention. This slows the cleaning process to below commercial chain speeds in a meat processing facility.

SUMMARY

It is thus one aspect of certain embodiments of the present invention to provide an intestine washing device and method that provides a throughput comparable to the rest of a meat production facility without requiring significant additional space or human assistance. In accordance with at least one embodiment of the present invention, a device for cleaning an animal intestine is provided. The device generally comprises a fluid supply line, a rotating fluid tank fluidically connected to the fluid supply line and adapted to rotate about the fluid supply line, and a flushing arm fluidically connected to the rotating fluid tank and operable to rotate about the rotating fluid tank. In one embodiment the tank is adapted to rotate about a substantially vertical axis. Accordingly, the flushing arm may rotate in a substantially horizontal plane. Since the majority of the device is oriented along a common vertical axis, the device does not consume as much space as intestine washing machines of the prior art.

In accordance with one embodiment of the present invention, a washing machine may be provided with a plurality of flushing arms each of which rotate about the fluid tank in a substantially horizontal plane. The flushing arms may rotate through a number of different working sections, where each section defines a different operational mode of the washing machine. The types of sections that the flushing arms may be rotated through include, but are not limited to, a loading section for loading intestine sections onto the flushing arm, a washing section for supplying cleaning fluid to the intestine sections via the flushing arm, and an unloading section for removing the washed intestine sections from the flushing arm. The relative size of each section may vary depending upon the number of operators available to load and unload the intestine sections, as well as the speed of rotation of the fluid tank. In accordance with an exemplary embodiment of the present invention, the intestine sections may be automatically unloaded from the flushing arms in the unloading section, thereby obviating the need for personnel to physically remove the intestine sections from the flushing arm. In accordance with one embodiment, a mechanism used to secure the intestine sections to the flushing arms may be disengaged in the unloading section while fluid is supplied to the intestine sections. The application of the fluid (flushed then drained, gravity will pull off the flush nozzle) to the intestine sections may create a force substantial enough to remove the intestine sections from the flushing arm automatically, at which point the intestine sections can be gathered and moved to the next stage of production.

In accordance with embodiments of the present invention, the fluid tank receives its fluid flow from a fluid supply line, which may be incorporated into a support structure for the fluid tank. The fluidic storage volume of the fluid tank may be larger than the fluidic storage volume of the supply line (or at least the support structure supplying the fluid to the supply line). In one embodiment, the fluidic storage volume of the fluid tank is about 1.5 times greater than the fluidic storage volume of the supply line in the support structure. In another embodiment, the fluidic storage volume of the fluid tank may be about 2 to 3 times greater than the fluidic storage volume of the supply line in the support structure. In still other embodiments, the fluidic storage volume of the fluid tank may be 10 times (or more) greater than the fluidic storage volume of the supply line in the support structure. In one exemplary embodiment of the present invention, the fluidic storage volume of the fluid tank may be about 20 cubic feet. By providing a fluid tank with a large fluid storage ability, a more constant fluid pressure can be maintained while supplying cleaning fluid to the flushing arms. Furthermore, since the fluid supply source is maintained centrally the advantage of not having to bring the flushing arms to the fluid source is achieved. Rather, the flushing arms can continue to move in a relatively small area while receiving fluid from the central source represented by the fluid tank.

In accordance with certain embodiments of the present invention, the flushing arms may be equipped with spigots each adapted to receive a section of animal intestine. The spigots may be tapered so as to accommodate animal intestines of various sizes. In one embodiment, the spigots may also be equipped with means for temporarily securing the animal intestines to the spigots. It is useful to secure the animal intestines to the spigots at least for the time the flushing arm is moving through the washing section and fluid is being provided to the intestine sections via the spigots. The spigots may be further adapted to clean both the interior and exterior surfaces of the intestine sections secured thereto at substantially the same time. In one embodiment, the spigots may be provided with a first set of orifices dedicated to issuing cleaning fluid on the interior surface of the intestine and a second set of orifices dedicated to issuing cleaning fluid on the exterior surface of the intestine. A focusing or flow redirection member may assist the direction of the cleaning fluid upon the exterior surface of the intestine. In one embodiment, the flow redirection member may comprise a convexly shaped piece of material that redirects cleaning fluid issued from the second set of orifices to the exterior surface of the intestine.

The washing machine of the present invention is characterized by the unique ability to provide substantial production throughput of intestines while not requiring a significant amount of operator assistance or space as compared to cleaning machines of the prior art. Advantageously, the washing machine of the present invention may be adapted for use in a new meat production facility or for use in an existing facility where space is limited and at a premium.

In accordance with other embodiments of the present invention, a method for cleaning animal intestines is provided. The method generally comprises securing an intestine section to a flushing arm, rotating the flushing arm about a central axis of a rotating fluid tank, receiving fluid under pressurized conditions at the flushing arm from the rotating fluid tank, and causing the fluid to issue under pressure from the flushing arm to wash the intestine section secured thereto. As noted above, by providing a centralized fluid tank around which flushing arms rotate a relatively small workstation dedicated to intestine washing can be realized. In one embodiment the central axis of the rotating fluid tank may be vertical, although such an orientation of the central axis is not a requirement. Rather, rotation about an axis offset from the vertical axis may be desirable in certain situations.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
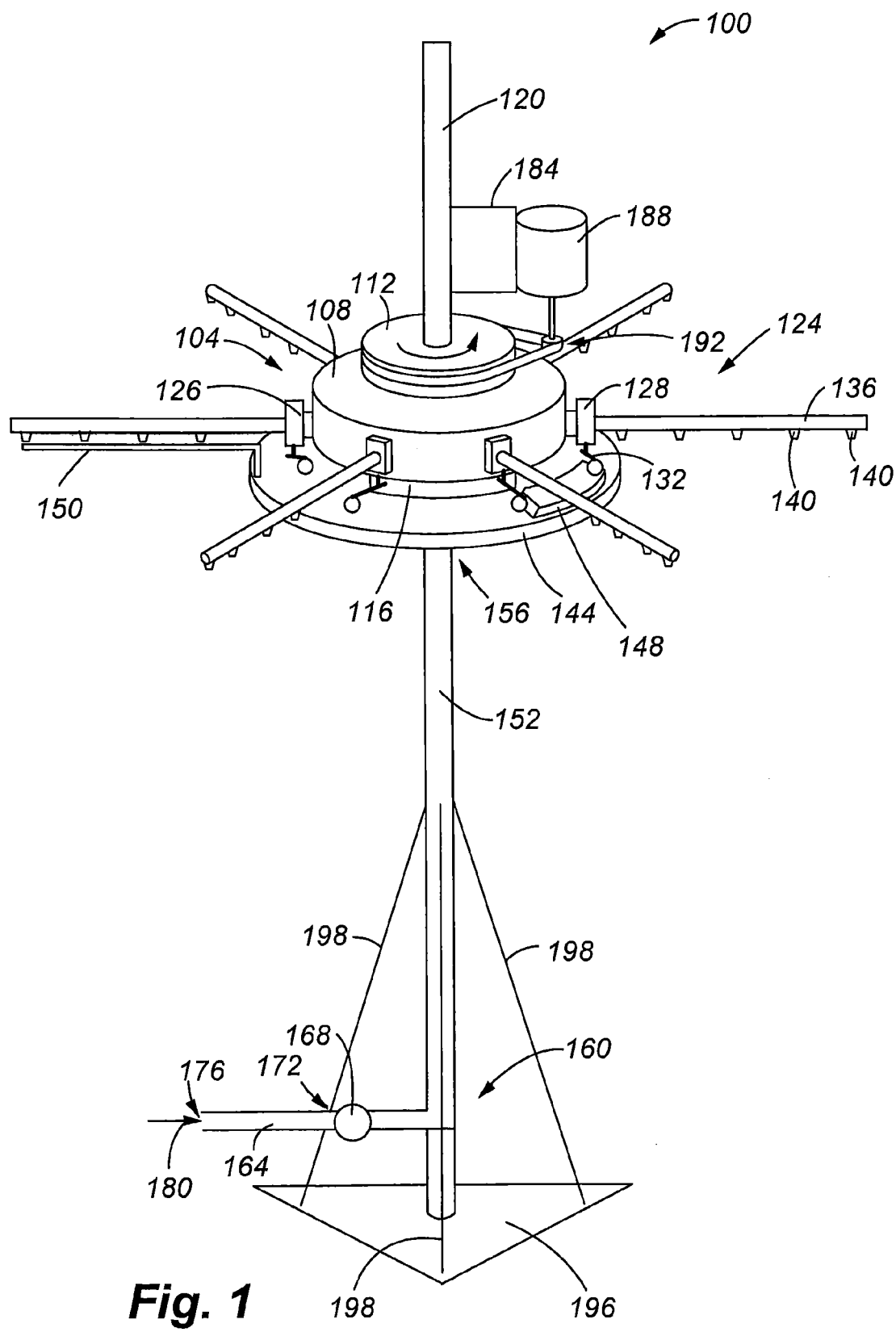
FIG. 1 is a perspective view of an intestine washing machine in accordance with certain embodiments of the present invention.

Referring initially to FIG. 1, an intestine washing machine 100 will be described in accordance with at least some embodiments of the present invention. The intestine washing machine 100 generally comprises a rotating assembly 104 supported by an upper support post 120 and a lower support post 152. The rotating assembly 104 rotates about the longitudinal axis extending through the center of support posts 120, 152. Although depicted as rotating counter clockwise, the rotating assembly 104 may rotate either clockwise or counter clockwise depending upon the orientation of the facility and user needs.

The rotating assembly 104 generally comprises a fluid tank 108, an upper cap 112, and a lower cap 116. The fluid tank 108 is used to store cleaning fluid and supply such fluid to the outer assembly 124. The fluid stored in the fluid tank 108 may be maintained at a predetermined pressure. Upper cap 112 and lower cap 116 function to create a liquid tight seal around the fluid tank 108 while allowing the fluid tank 108 to rotate about its central axis. The rotating assembly 104 is generally symmetrical, meaning that the dimensions of the upper cap 112 and lower cap 116 are typically the same. Of course, the radius of the upper cap 112 may differ from the lower 116 depending upon machine requirements. For example, a larger lower cap 116 may be used to provide more support for the fluid tank 108 and outer assembly 124. The radius of the fluid tank 108 may vary from about 1 ft to about 4 ft and typically has a larger storage volume than the support posts 120, 152 which are used to provide fluid thereto. A larger fluid tank 108 may be used if space usage of the washing machine 100 is not a significant consideration. On the other hand, a smaller fluid tank 108 may be employed when the space designated for the cleaning machine is limited.

The fluid tank 108 may further comprise outlet ports 126 for connecting to the outer assembly 124. A single outer assembly 124 generally comprises a flushing arm 136, ON/OFF flush valve 128, valve controller 132, and intestine interface 140. Each outlet port 126 may be connected to an ON/OFF flush valve 128, which is in turn in communicates one or more flushing arms 136. In accordance with embodiments of the present invention, each outlet port 126 may correspond to a single flushing arm 136. For instance, if the fluid tank 108 comprises six outlet ports 126, then six flushing arms 136 may be connected to the fluid tank 108, where each outlet port communicates with a different flushing arm 136. In an alternative embodiment, each outlet port 126 may support two or more flushing arms 136. For instance, a Y or T-junction may be connected between the outlet 126 and the flushing arm 136. The junction may reside either on the fluid tank 108 side of the flush valve 128 or on the flushing arm 136 side of the flush valve 128. If the junction is provided on the fluid tank 108 side of the flush valve 128, then two flush valves 128 may be provided for each outlet 126. Accordingly, a single flush valve 128 may be employed to control fluid flow to one or more flushing arms 136. The ON/OFF state of the flush valve 128 may be controlled by a valve controller 132. The position of the valve controller 132 may determine whether the flush valve 128 is in the ON (or open) position such that fluid is allowed to flow from the fluid tank 108 to the flushing arm 136 or in the OFF (or closed) position such that fluid flow from the fluid tank 108 to the flushing arm 136 is restricted.

The position of the valve controller 132 may be partially controller by a combination of a platform 144 and a riser 148. The rotating assembly 104 generally resides on the platform 144 and rotates on the platform 144. The riser 148 is provided on the platform 144 and defines a separate section of the washing machine 100. In accordance with one embodiment, when the valve controller 132 transitions from contacting the platform 144 to contacting the riser 148 the position of the controller 132 changes, which precipitates a change in the state of the flush valve 128. In one embodiment, the flush valve 128 is in a closed position when the controller 132 is contacting the platform 144 and the flush valve 128 is in an open position when the controller 132 is contacting the riser 148. Of course, the states of the flush valve 128 may be reversed such that the flush valve 128 is in a closed position when the controller 132 is contacting the riser 148 and the flush valve is in an open position when the controller is contacting the platform 144.

Each flushing arm 136 may be provided with a plurality of intestine interfaces or spigots 140. Each spigot 140 may provide cleaning fluid to a section of animal intestine. A section of intestine may be temporarily secured to a spigot 140 and hang downward therefrom such that gravity can assist in the intestine cleaning process while fluid is flushed through the intestine. In the depicted embodiment, each flushing arm 136 comprises five spigots 140. It should be appreciated, however, that a greater or lesser number of spigots 140 may be provided on each flushing arm 136. The number of spigots 140 on each flushing arm 136 may vary from a one to twenty spigots. In a preferred embodiment, each flushing arm 136 comprises four spigots 140. In another embodiment of the present invention, some flushing arms 136 comprise a first number of spigots 140 (e.g., four) while other flushing arms 136 may comprise a second different number of spigots 140 (e.g., six). The number of spigots 140 provided on each flushing arm 136 may vary depending upon the number of flushing arms 136 provided on the fluid tank 108, the speed of rotation of the rotating assembly 104, and the number of workers available to run the washing machine 100.

The combination of the platform 144 and riser 148 may be used to define two sections of the washing machine 100, namely the washing section and the loading section. A trip lever 150 may also be provided to define a third section of the washing machine 100. The trip lever 150 may engage one or all of the spigots 140 on a flushing arm 136 as the flushing arm 136 passes across the trip lever 150. The trip lever 150 may cause the sections of intestine to release from the spigots 140 into a collection area. A typical collection area may include a catch bin and/or a slide/conveyor for moving the cleaned sections of the intestine to the next stage of production.

The fluid tank 108 may comprise additional outlet ports 126 that are not connected to an outer assembly 124 at all. Rather, some outlet ports 126 may be maintained for backup purposes, in case another outlet port 126 becomes clogged or otherwise incapacitated. When not in use, the outlet ports 126 may be capped to restrict fluid flow therefrom. In accordance with one embodiment of the present invention, six outlet ports 126 may be provided on the fluid tank 108 and each outlet port 126 may correspond to a single flushing arm 136. In another embodiment of the present invention, twelve outlet ports 126 may be provided on the fluid tank 108 each corresponding to a different flushing arm 136. Accordingly, the number of flushing arms 136 provided on the washing machine 100 may vary between a single flushing arm 136 up to twenty flushing arms 136, with the preferred number of flushing arms varying from six to twelve flushing arms 136.

In accordance with one embodiment of the present invention, there may be 12 flushing heads 136 provided on the fluid tank 108, each having four spigots 140. The rotating assembly 104 may rotate at an approximate speed of 2.4 RPMs. This rotation speed and outer assembly 124 configuration results in 48 flushers per rotation or 115 flushers per minute. In one embodiment, intestine segments may be cut to a length of between about 1 ft to about 20 ft, with a more preferable length of being between about 4 ft and about 10 ft, and a most preferred length being between about 6 ft and about 8 ft. Assuming a spigot 140 washes an average of 7 ft of intestine on every rotation of the rotating assembly 104 (e.g., one rotation every 25 seconds), then a total of about 800 ft of intestine can be washed every minute. Assuming that the average bovine intestine is 100 ft in length, this results in about eight head of bovine intestine washed every minute or about 480 head of bovine intestine washed every hour. Therefore, a washing machine 100 equipped with 12 flushing arms rotating at 2.4 RPMs can have an intestine throughput of up to about 480 head of bovine every hour. This is a substantially higher throughput as compared to the throughput of intestine washing machines known in the prior art. Furthermore, since the rotating assembly 104 rotates about a substantially vertical axis, the amount of space required to achieve such a throughput is relatively minimal.

Fluid may be provided to the fluid tank 108 via the lower support post 152, although the upper support post 120 may also be employed to supply the fluid. The lower support post 152 generally comprises a proximal end 156 and a distal end 160. The proximal end 156 of the support post 152 is operably connected to the platform 144 while the distal end 160 of the support post 152 is operably connected to a fluid supply line 164. A pressure control valve 168 may also be provided between the connection of the distal end 160 of the support post 152 and the fluid supply line 164. A proximal end 172 of the fluid supply line 164 may be connected to the pressure control valve 168 while a distal end 176 of the fluid supply line 164 receives the cleaning fluid 180 flow. The type of cleaning fluid 180 used may comprise any known type of chemical solution used to clean intestines and remove bacteria therefrom. Alternatively, the cleaning fluid 180 may comprise water or a combination of water other additives. Of course, other known types of cleaning fluids may be utilized within the scope of the present invention.

The pressure control valve 168 generally functions to control fluid flow into the fluid tank 108 and limit the fluid pressure in the fluid tank 108. The pressure control valve 168 may be adjusted to allow more fluid pressure to build in the fluid tank 108 or to decrease the fluid tank 108 pressure. The amount of pressure allowed to build in the fluid tank 108 may also vary depending upon the rotation speed of the rotating assembly 104.

The speed of rotation of the rotation assembly 104 may be controlled by a motor 188. The motor 188 may be mounted to the upper support post 120 by a mounting bracket 184. The motor 188 operates a drive assembly 192, which engages the upper cap 112 of the rotating assembly 104. The drive assembly 192 may comprise any known combination of parts known to induce rotation of an object. For example, the drive assembly 192 may comprise a chain and gear assembly or a friction belt assembly. Other types of rotation inducing means may be employed such as a water impeller that is provided on the inside of the rotation assembly 104. The pressurized fluid 180 provided by the fluid supply line 164 may engage the impeller which induces rotation in the rotating assembly 104 as well as fills the fluid tank 108 with pressurized fluid. Furthermore, the motor 188 may comprise an internal gear system that can be used to adjust the speed of rotation of the rotating assembly 104 with relative ease. Although the drive assembly 192 is shown engaging the rotating assembly 104 at the upper cap 112, one skilled in the art will appreciate that the drive assembly 192 may engage the rotating assembly 104 at any other position to induce rotation of the assembly about the vertical axis of the support posts 120, 152.

A support base 196 and support legs 198 may also be provided to stabilize the washing machine 100. The support base 196 may rest on the ground or some other type of flat surface while each support leg 198 extends from the base 196 to a point on the lower support post 152. In an alternative embodiment, the support structure for the washing machine 100 may support the machine 100 from above. For instance, support chains or the like may extend from the ceiling and engage the upper support poser 120 to help stabilize the washing machine 100. In still a further embodiment of the present invention, supports for both the upper and lower portions of the washing machine 100 may be provided to further enhance the stability of the machine 100.

Figure 2:
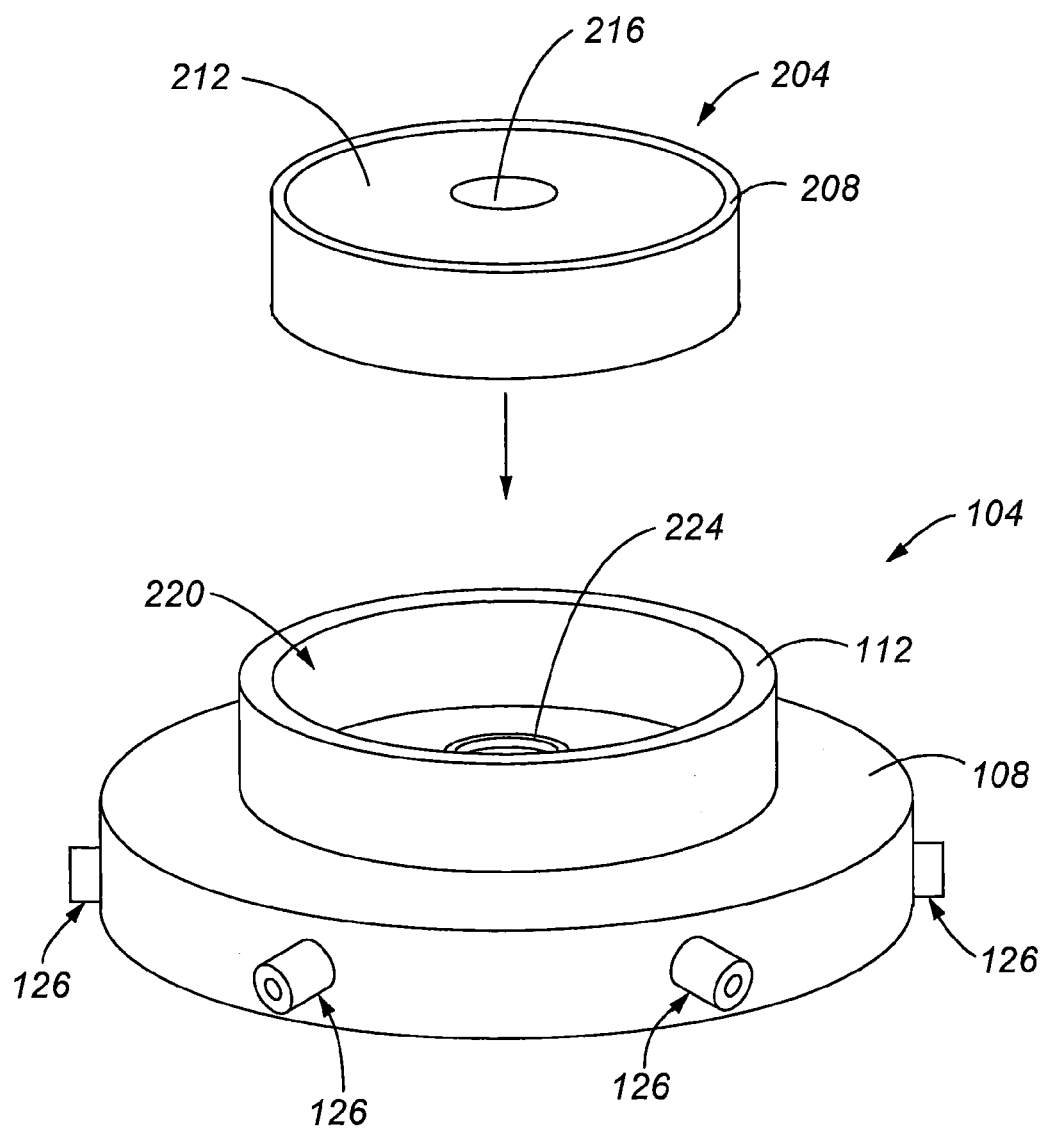
FIG. 2 is a perspective view of a rotating fluid tank and compression fitting in accordance with certain embodiments of the present invention.

With reference now to FIG. 2, an exemplary rotating assembly 104 will be described in accordance with at least some embodiments of the present invention. The upper cap 112 may comprise a cylindrical ring having an inner radius that is slightly smaller than the outer radius. The cylindrical ring may be integral to (i.e., forming one piece with) the fluid tank 108 or may be connected to the fluid tank 108 via a known connection mechanism such as by welding, fastening, gluing, etc.

The cylindrical ring leaves a housing area 220 for a compression fitting 204. The compression fitting 204 may generally comprise an outer cylinder 208 and an inner cylinder 212. The outer cylinder 208 may have an inner radius and an outer radius, where the inner radius is approximately the same or slightly larger than the outer radius of the inner cylinder 212. This allows the inner cylinder 212 to fit within the outer cylinder 208. The inner cylinder 212 may have an inner radius that is approximately equal to the outer radius of the support post 120, 152. The inner radius of the inner cylinder 212 may correspond to a post hole 216 that is adapted to receive the support post 120, 152. This allows the post to pass through the inner cylinder 212 of the upper cap 112, fluid tank 108, and the inner cylinder of the lower cap 116.

The inner cylinder 212 may be made of a rigid but slightly compressible material that affords the rotating assembly 104 to rotate freely about the support post 120, 152. The inner cylinder 212 can also be used to provide a relatively smooth interface between the platform 144 and the rotating assembly 104. In accordance with one embodiment of the present invention, the inner cylinder 212 is made of a polymer such as a high-density polyethylene that provides a relatively low coefficient of friction against the platform 144 as well as the ability to seal the opening of the fluid tank 108.

The fluid tank 108 may further comprise a tank seal 224 on both the top and bottom of the tank. The tank seal 224 may be made of a more formable type of polymer that can create a liquid tight seal between the fluid tank 108 and the post 120, 152, when the compression fitting 204 is placed over the tank seal 224. In accordance with one embodiment of the present invention, the tank seal 224 comprises compliant seal such as a rubber seal that when compressed by the compression fitting 204 seals the fluid tank 108.

Although only the upper cap 112 of the rotating assembly 104 has been described in relation to FIG. 2, the lower cap 116 of the rotating assembly 104 comprises essentially the same parts as the upper cap 112. More specifically, a lower compression fitting is provided to fit into a lower fitting housing and create a liquid seal on the bottom of the fluid tank 108. The compression fitting may be used to compress a tank seal that has a radius approximately equal to the outer radius of the support post 120, 152. The lower compression fitting may also provide a point of contact between the rotating assembly 104 and the platform 144. The upper and lower compression fittings may be used interchangeably between the upper cap 112 and lower cap 116. Namely, the fittings may be rotated between the caps to distribute the wear between both fittings.

Figure 3:
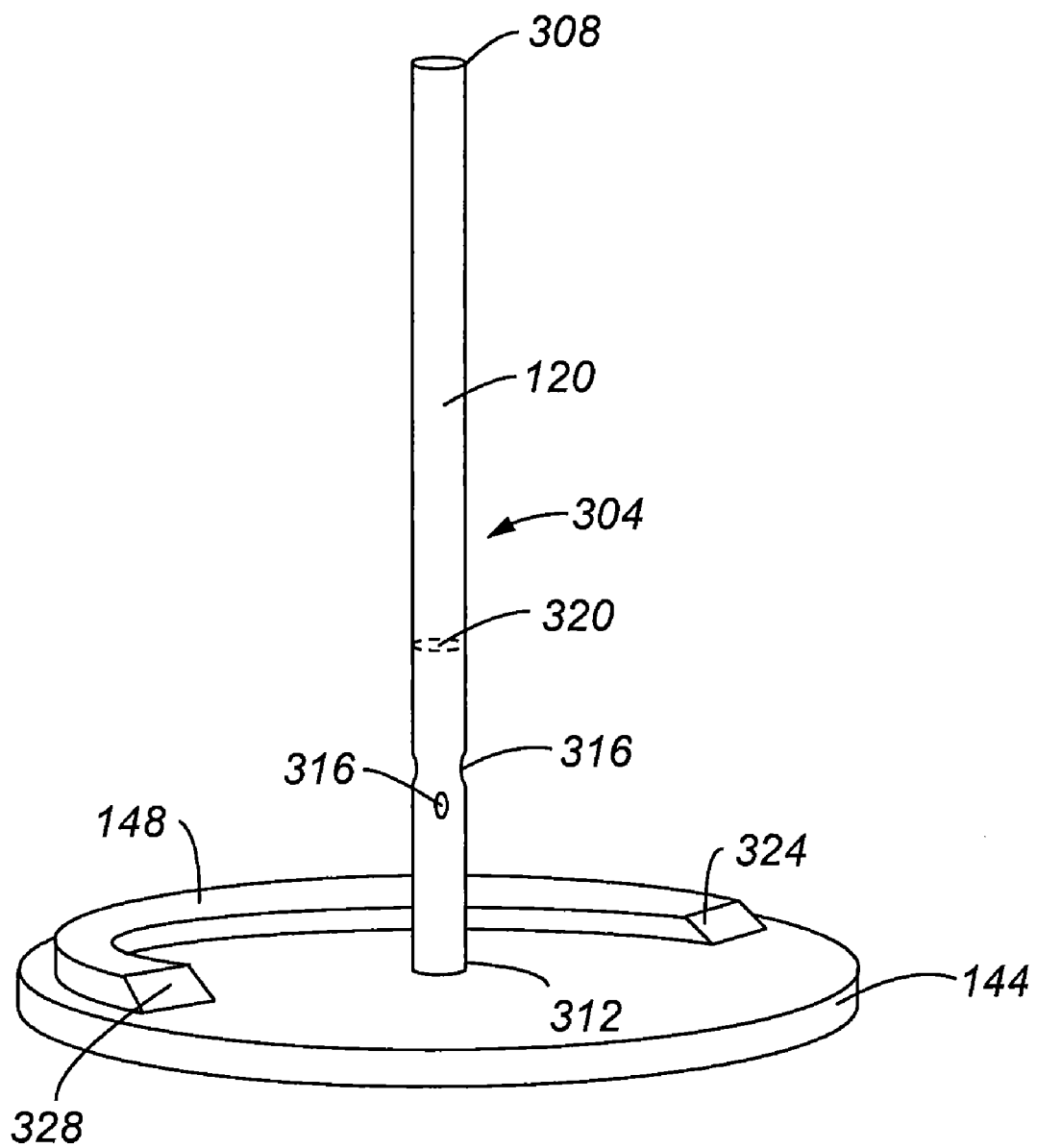
FIG. 3 is a top perspective view of a tank platform and fluid supply line in accordance with certain embodiments of the present invention.

FIG. 3 is a perspective view of the top of the platform 144 interconnected to the upper support post 120 in accordance with at least some embodiments of the present invention. The support post 120 may be integral to the platform 144 or separably connected to the platform 144. The support post 120 comprises a middle section 304, a distal end 308, and a proximal end 312. The proximal end 312 of the support post 120 communicates with the platform 144, preferably at the center point of the platform 144. The longitudinal axis of the support post 120 is preferably perpendicular to the surface plane of the platform 144, although such an orientation is not required. The middle section 304 of the support post 120 may further comprise perforations or holes 316. Fluid supplied by the supply line 164 may enter the fluid tank 108 via the holes 316 in the support post 120. The number or area of holes 316 present on the support post 120 can vary but should be suitable to allow free fluid flow from the support post 120 to the fluid tank 108, without sacrificing the structural integrity of the support post 120. The support post 120 may further comprise a cap 320 that restricts fluid flow within the support post 120 and forces all fluid received by the support post 120 to exit via the holes 316.

The platform 144 may also comprise a riser 148. The riser 148 is used to define sections of the washing machine 100. Namely, the area of rotation corresponding to the area defined by the riser 148 may constitute a washing section whereas the other sections of the platform 144 correspond to a loading and unloading section of the washing machine 100. Alternatively, the riser 148 may define a washing section and unloading section of the washing machine 100. The riser 148 may comprise a first end 324 and a second end 328 that constitute the beginning and end of the riser 148. The ends 324, 328 of the riser 148 may comprise a transitional area to provide a smooth transition between the elevation of the platform 144 to the elevation of the riser 148. The riser 148 is useful in embodiments where a mechanically controller flush valve 128 is employed. However, other embodiments can be envisioned where the operation of the flush valve 128 is controlled by an electromechanical transducer. For instance, an electrical switch may be employed to actuate the flush valve 128 between an open and closed state. In such embodiments, the presence of a physical riser 148 may not be necessary to define working sections of the washing machine 100. Rather, an electrical switch may be engaged and disengaged by simple trip levers or a position sensor and controller. However, in embodiments employing a mechanical controller, a riser 148 provides an effective way to actuate the mechanical controller and engage/disengage fluid flow to the flushing arms 136.

In accordance with at least some embodiments of the present invention, the riser 148 may be a separate piece from the platform 144. The length of the riser 148 may also be adjustable, that is the distance between the first end 324 and second end 328 of the riser 148 may be adjusted to accommodate intestine sections of different lengths or different rotation speeds. In an alternative embodiment, the riser 148 may be integral to the platform 144. In still another embodiment, the platform 144 may be tilted off-axis relative to the support post 120 to mechanically represent the riser 148 at its highest end without actually requiring a separate riser 148.

Figure 4:
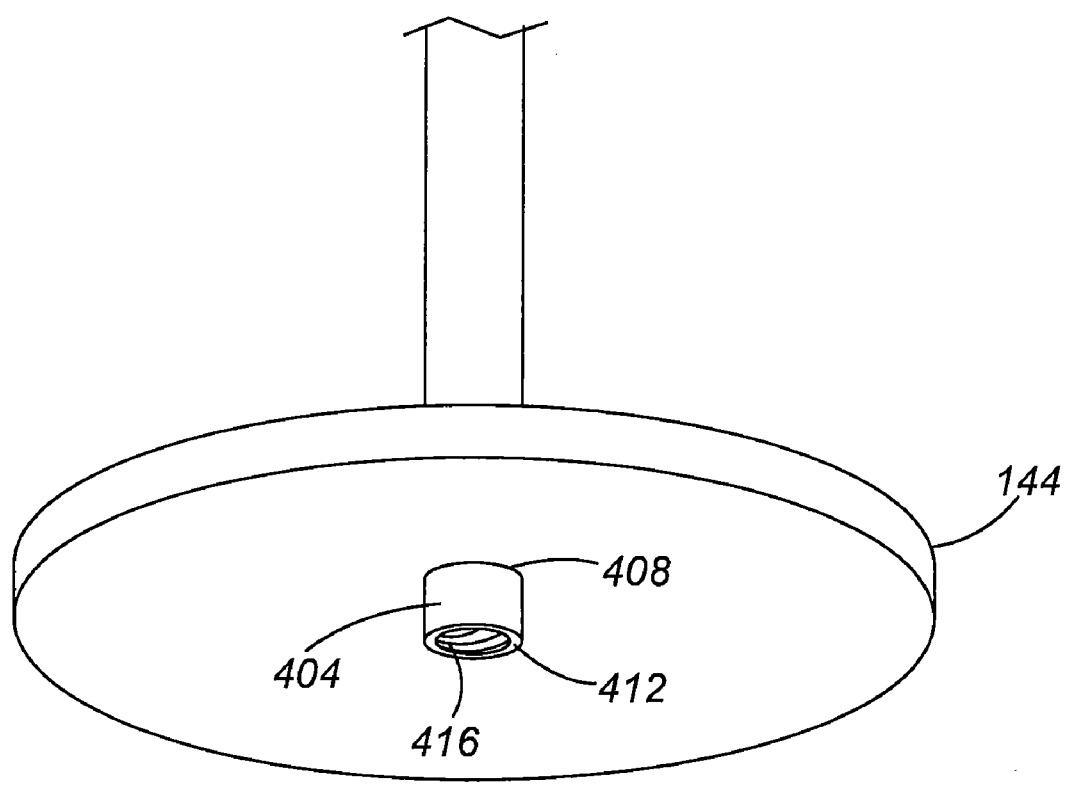
FIG. 4 is a bottom perspective view of a tank platform and fluid supply line coupling in accordance with certain embodiments of the present invention.

FIG. 4 is a perspective view of the bottom of the platform 144 in accordance with at least some embodiments of the present invention. The bottom of the platform 144 may comprise an interface 404 for receiving the lower support post 152. The interface 404 may comprise a proximal end 408 in communication with a surface of the platform 144 and a distal end 412 adapted to receive the lower support post 152. The interface 404 is characterized by the ability to provide a connection means between the upper support post 120 and lower support post 152 such that fluid can be transferred from the lower support post 152 to the upper support post 120 and ultimately into the fluid tank 108. The interface 404 is useful in embodiments where the support posts 120, 152 are distinct and separate pieces. However, in accordance with some embodiments of the present invention, the support posts may be a single piece having the platform 144 connected thereto and adapted to receive the rotating assembly 104, in which case the use of an interface 404 becomes unnecessary.

In embodiments employing an interface 404, the interface 404 may be adapted as a female coupling to receive the lower support post 152, although a male coupling interface 404 may also be employed. The interface 404 may comprise threading 416 therein to help secure the support post 152 and create a fluidic seal. As can be appreciated by one skilled in the art, connection means other than a threaded assembly can be employed such as a quick-coupling assembly, a friction fit assembly, a buckling assembly, and the like. The purpose of the interface 404 is to provide a secure fluidic connection between the support posts 120, 152 and the mechanisms employed to achieve such a result should not be limited to those examples described herein.

Figure 5:
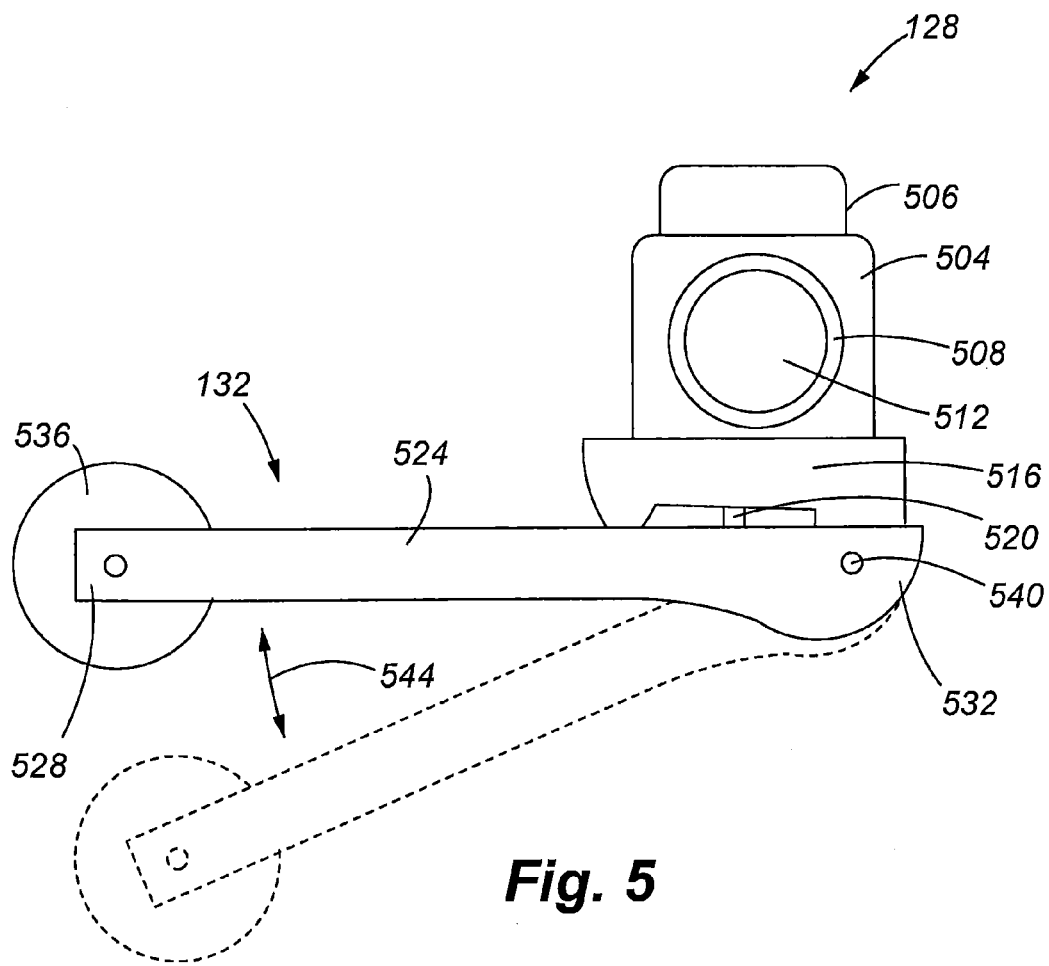
FIG. 5 is a side view of a fluid control valve in accordance with certain embodiments of the present invention.

FIG. 5 is a side view of an exemplary flush valve 128 and controller 132 in accordance with at least some embodiments of the present invention. As noted above, although the present invention is described in accordance with a mechanical valve controller, one skilled in the art will appreciate that an electromechanical or purely electrical valve controller may be employed to switch the flush valve 128 between operational states. In the depicted embodiment, the flush valve 128 comprises a body 504, a flushing arm 136 interface 508 having a valve outlet 512 defined therein, and a support arm 516. The body 504 of the flush valve 128 may comprise a solid material such as metal or a somewhat compliant material such as a high-density polymer.

The interface 508 may comprise a cylindrical section of material extending away from the body 504. The interface 508 may be a male or female coupling interface for attaching the flushing arms 136 or flow-separation junction to the body 504. The inner radius of the interface 508 may define the outer limits of the valve outlet 508. Fluid is allowed to flow from the fluid tank 108 though the body 504 to the flushing arms 136 when the valve outlet 508 is in an open position. When the valve outlet 508 is in a closed position, the fluid may be restricted from flowing beyond the body 504. A control piston 520 that is connected to the controller 132 may manipulate the position of the valve outlet 508.

In accordance with at least some embodiments of the present invention, the valve body 504 is fixed relative to the support arm 516. The control piston 520 extends from the body 504 past the control arm 516 to the controller 132. As the position of the controller 132 changes so too does the position of the control piston 520. The controller 132 generally comprises a lever arm 524 having a first end 528 and a second end 532. The first end 528 of the lever arm 524 may have a wheel 536 or similar type of rolling mechanism such as a ball bearing connected thereto. Alternatively, the first end 528 of the lever arm 524 may be smoothed such that the lever arm 524 can glide easily across the platform 144 and riser 148. The second end 532 of the lever arm 532 may be pivotally connected to the support arm 516 at a pivot point 540. The lever arm 534 is allowed to swing between operational positions depicted by the movement arrow 544. In the first position the lever arm 534 may cause the piston 520 to open the valve outlet 512, whereas in the second position the lever arm 534 may cause the piston 520 to close the valve outlet 512. The body 504 of the valve 128 may further comprise a recessed portion 506 that can receive the flow stopper when the piston 520 pushes the flow stopper out of the valve outlet 512 and into the open position.

Figure 6:
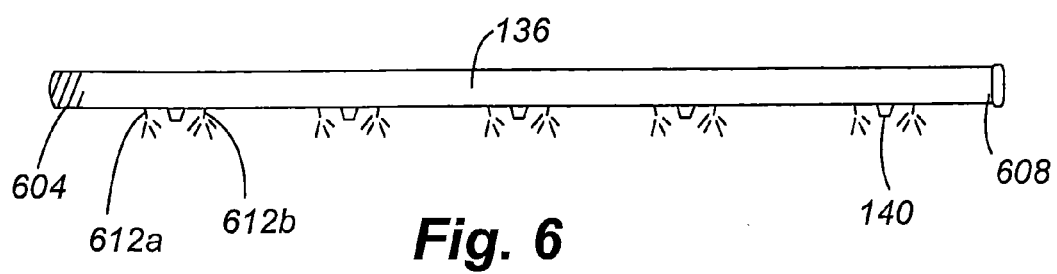
FIG. 6 is a side view of a flushing arm in accordance with certain embodiments of the present invention.

Referring now to FIG. 6, a flushing arm 136 will be described in accordance with at least some embodiments of the present invention. The flushing arm 136 may comprise a plurality of spigots 140 between a proximal end 604 of the arm and a distal end 608 of the arm. The proximal end 604 may be fluidically connected to the fluid tank 108 directly or via a flush valve 128. The proximal end 604 may also comprise threading adapted to engage threading on the arm interface 508 such that a fluidic seal is maintained between the arm 136 and fluid tank 108. The distal end 608 of the arm 136 may comprise a capped end that restricts the flow of fluid within the flushing arm 136 to only the outlets defined by the spigots 140 and any other sprayers provided thereon.

In addition to the spigots 140, which are generally adapted to wash the interior surface of a section of intestine, the flushing arm 136 may further comprise external sprayers 612. A first sprayer 612a may be provided to wash a first exterior side of the intestine while a second sprayer 612b may be provided to wash a second exterior side of the intestine. The capability of the exterior sprayers 612 may also be provided by the spigots 140 themselves. In other words, the flushing arm 136 may be equipped with spigots 140 capable of washing the interior and exterior surface of a section of intestine.

Figure 7A:
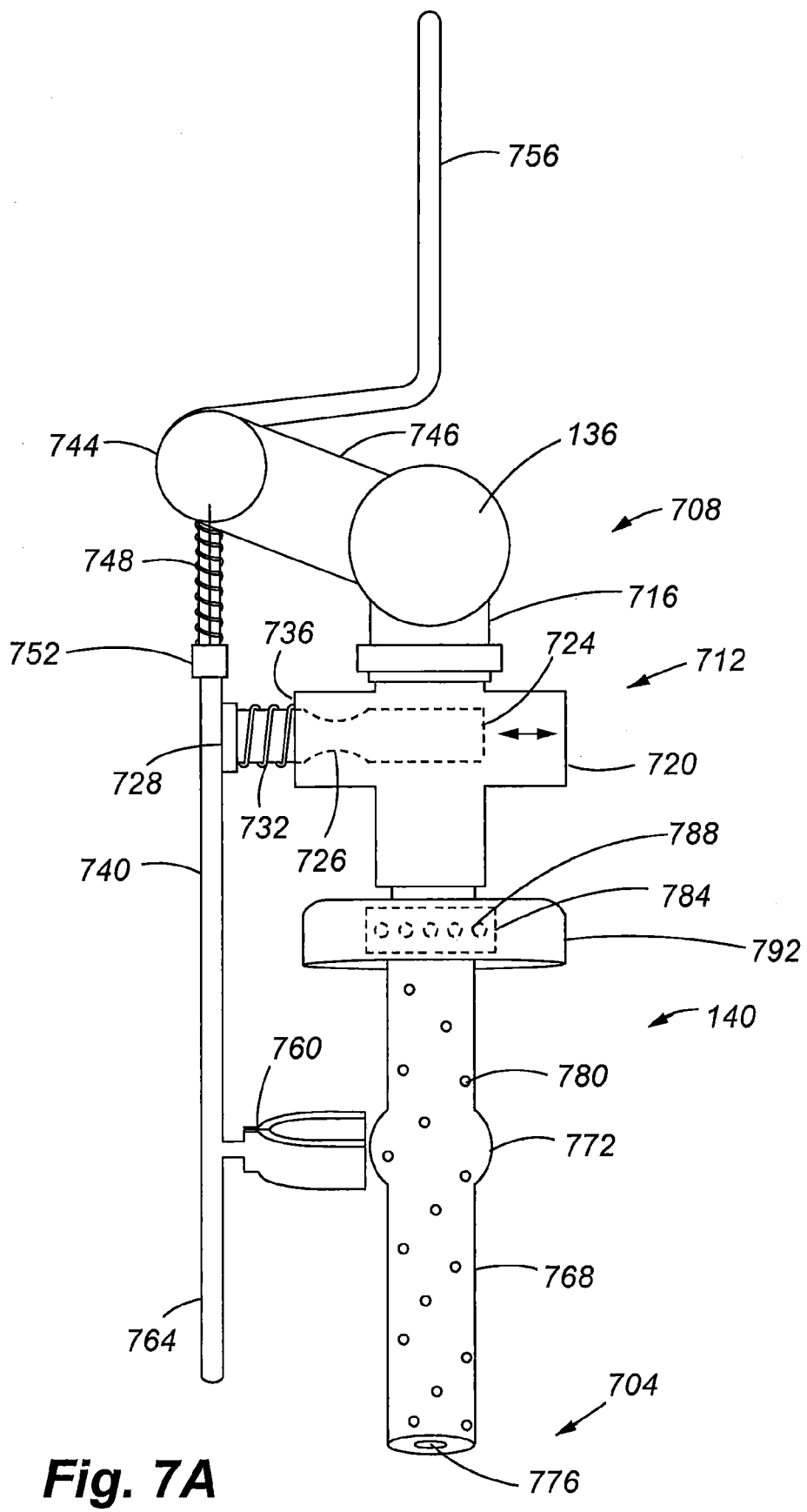
FIG. 7A is a side view of a spigot in a first configuration in accordance with certain embodiments of the present invention.
Figure 7B:
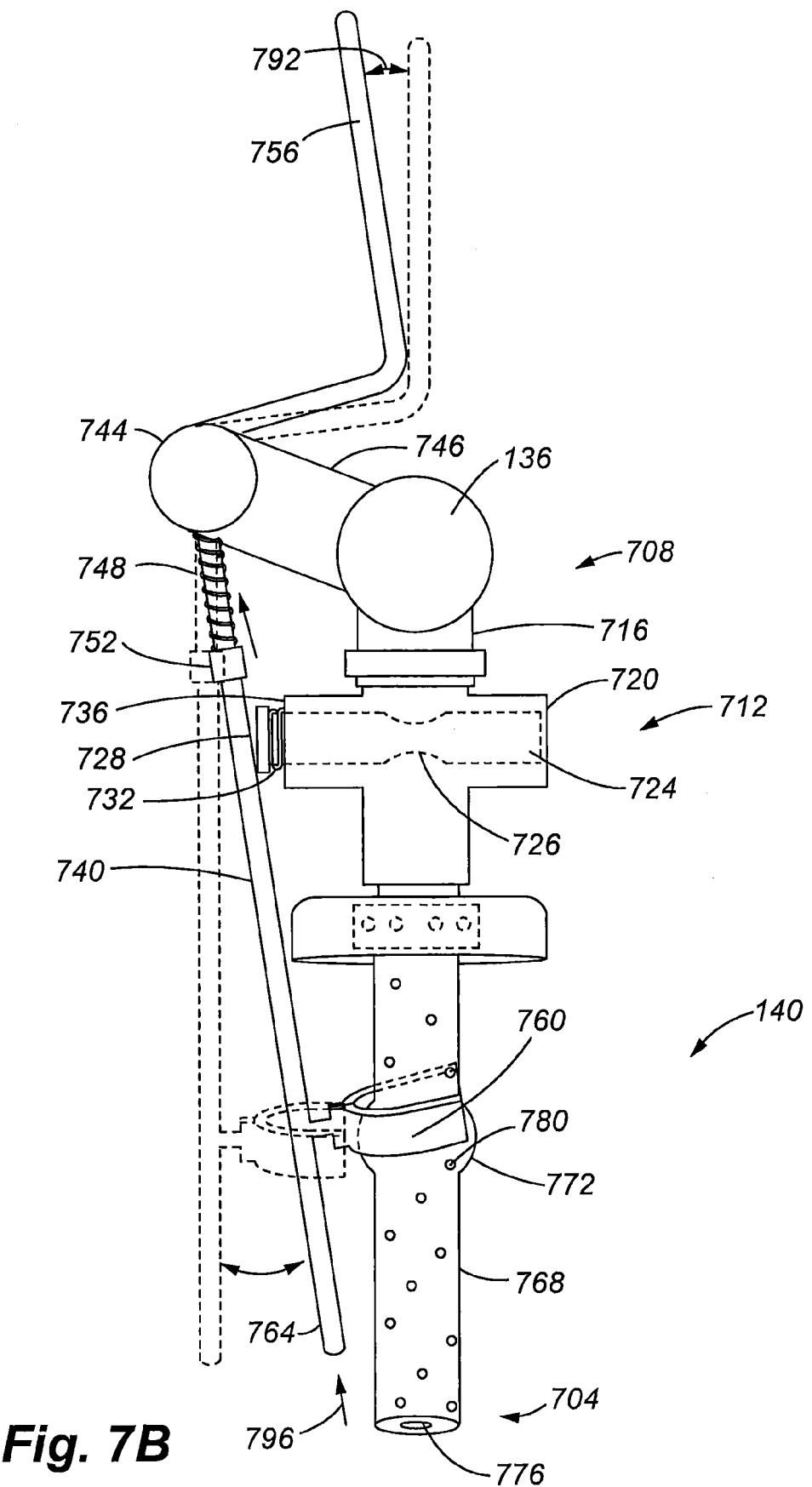
FIG. 7B is a side view of a spigot in a second configuration in accordance with certain embodiments of the present invention.
Figure 7C:
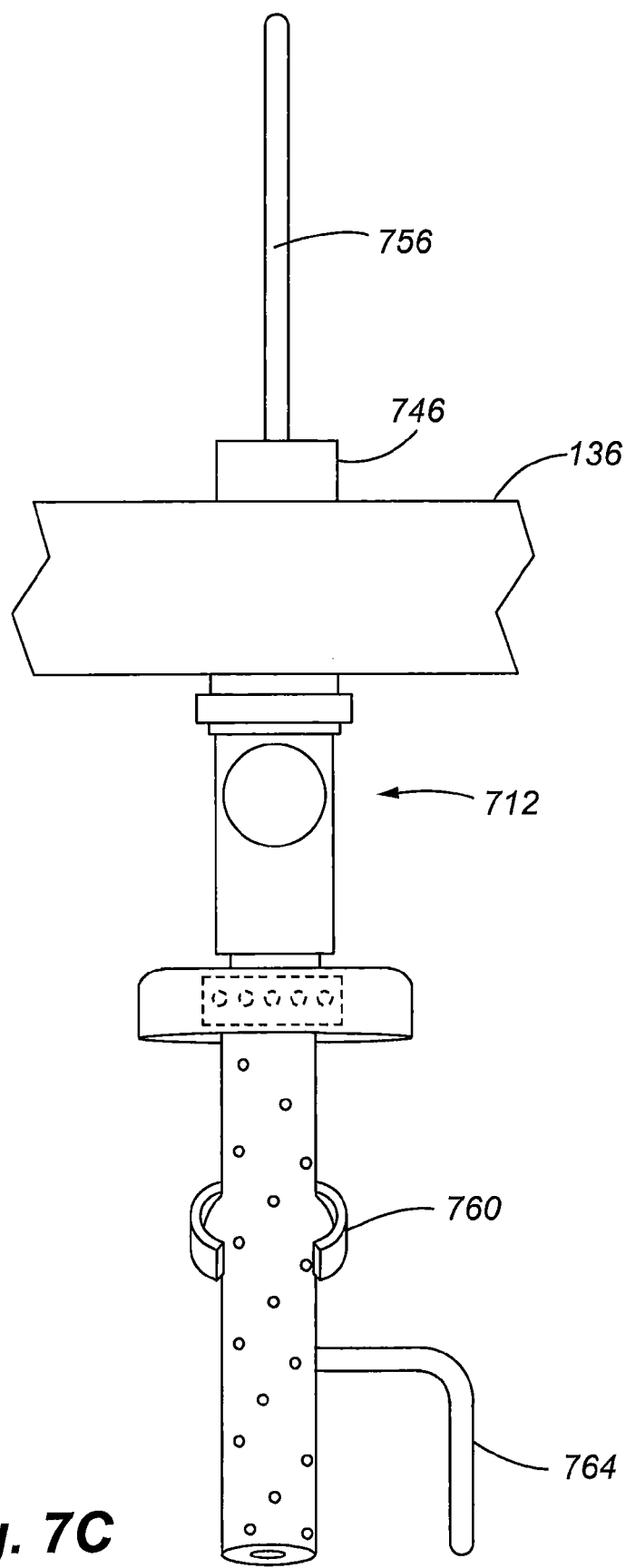
FIG. 7C is a front view of a spigot in accordance with certain embodiments of the present invention.

With reference to FIGS. 7A-C an exemplary configuration of a spigot 140 will be described in accordance with at least some embodiments of the present invention. As can be seen in FIG. 7A, a spigot 140 may comprise a distal end 704, a proximal end 708 and a fluid flow assembly 712 therebetween. The proximal end 708 of the spigot 140 may be adapted to connect to the flushing arm 136 at a connection point 716. Fluid is received by the spigot 140 at the proximal end 708 and maintained in the fluid flow assembly 712 while the spigot 140 is in a closed position. If the spigot 140 is in an open position, then the fluid is allowed to flow through the fluid flow assembly 712 toward the distal end 704 of the spigot 140.

Between the distal end 704 of the spigot 140 and the fluid flow assembly 712, the spigot 140 may comprise a number of orifices though which the fluid can pass to the section of intestine attached thereto. A first orifice comprises the main outlet 776, which can supply a pressurized stream of fluid through the section of intestine. The pressurized stream of fluid from the main outlet 776 may be capable of dislodging various large debris residing in the intestine such as pebbles and other ingested remnants. A plurality of additional orifices 780 may cover the rest of the body 768 of the spigot 140. The additional orifices 780 may span the circumference of the body 768 of the spigot 140.

The plurality of orifices 780 on the body are generally intended to wash the insides of the intestine attached to the body 768. The spigot 140 may further comprise orifices 788 for washing the outside of the intestine. The orifices 788 may be provided on an extension 784 that connects the body 768 to the fluid flow assembly 712. The orifices 788 may span the circumference of the extension 784. The spigot 140 may also be provided with a flow redirection member 792 that circumnavigates the orifices 788. In accordance with one embodiment, the flow redirection member 792 comprises material formed to have a convex curvature that opens downwards toward the body 768 and is closed at the top. The flow redirection member 792 may be adapted to redirect fluid ejected from the orifices 788 toward the outer surface of the intestine connected to the body 768.

The fluid flow assembly 712 may comprise parts configured to stop the flow of fluid therethrough in one position and allow the flow of fluid in a second position. In accordance with one embodiment, the fluid flow assembly 712 comprises a plug 724 having a recess 726 drilled through a portion of it. The plug 724 is biased in the first position (e.g., a closed position) by a spring 732 that engages a stopper portion 728 of the plug 724 and a first side 736 of the fluid flow assembly 712. The spring 732 forces the stopper portion 728 away from the first side 736 when no additional forces are applied to the plug 724. In this first position, the recess 726 is not in line with the rest of the conduit connecting the body 768 and the connection point 716. This restricts the flow of fluid at the fluid flow assembly 712.

When a force is applied to the plug 724, namely at the stopper portion 728, the plug 724 may be moved laterally relatively to the spigot 140 such that the recess 726 is in line with the rest of the conduit connecting the body 768 and the connection point 716. In this position, fluid can flow from the flushing arm 136 to the body 768 and out the various orifices 776, 780, 788 of the body 768, thereby washing the intestine connected thereto.

In accordance with embodiments of the present invention, a spigot 140 may comprise a bulge 772 on the body 768. The radius of the bulge 772 may be larger than the radius of the rest of the body 768, namely the distal end 704 of the spigot 140 and the portion of the body 768 above the bulge 772. The bulge 772 may help facilitate the securing of a section of intestine to the spigot 140, especially during the washing section when fluid pressure is applied to the intestine that would otherwise cause the intestine to disengage the spigot 140.

The bulge 772 helps to retain a section of intestine with the cooperative use of a retainer arm 740. The retainer arm 740 may rotate about a pivot point 744 that is offset from the flushing arm 136. In accordance with one embodiment of the present invention, the pivot point 744 is operably connected to the flushing arm 136 via a connection member 746. The retainer arm 740 may be also be adapted to move slightly into and out of the pivot point 744 such that the retainer arm 740 can adjust its height relative to the body 768 without pivoting. The retainer arm 740 may be biased toward a first lower position by a spring 748 that engages a knob 752 on the retainer arm 740 and pushes the retainer arm 740 downward. The pivot arm 740 may further comprise a clamping ring 760 that can engage the bulge 772 when positioned properly. More specifically, the clamping ring 760 may comprise two arms in the shape of a semi-circle that has a radius larger than the body 768 of the spigot 140 but smaller than the radius of the bulge 772. A section of intestine may be placed of the bulge 772 and the retainer arm 740 may be maneuvered to engage the clamping arm 760 over the intestine and the bulge 772, thereby securing the intestine to the bulge 772. The retainer arm 740 may further comprise a release arm 756 that can be engaged by trip lever 150 at which point the clamping ring 760 is disengaged from the bulge 772 and the intestine is released from the spigot 140.

Referring now to FIG. 7B, from the first position, the retainer arm 740 may be pushed into the pivot point 744 in the direction of arrow 796, thereby increasing the bias force of the spring 748. Then the retainer arm 740 may be pivoted toward the body 768 and released. The retainer arm 740 may comprise a handle 764 adapted for a user to hold and maneuver the retainer arm 740 in accordance with embodiments of the present invention. After the retainer arm 740 has been released, the spring 748 biases the clamping ring 760 into the bulge 772 such that the clamping ring 760 remains secured to the bulge in the absence of additional forces on the retainer arm 740. While in this second position, the body of the retainer arm 740 engages the stopper 728 of the plug 724 and moves the plug into the second (e.g., open position). Accordingly, fluid is allowed to flow through the spigot 140 via the recess 726 only when the clamping ring 760 is engaging the body 768, and more specifically the bulge 772. Then, when the trip lever 150 engage the release arm 756, a suitable force is applied to the retainer arm 740 about the pivot point 744 such that the clamping ring 760 is released from the bulge 772 and the arm swings about the pivot point 744 in the direction of arrow 792 back to the first position. With the clamping ring 760 released from the bulge 772, the intestine section attached to the body 768 may either fall off or be removed from the spigot 140 and a new section may be loaded on the spigot 140. The retainer arm 740 along with the clamping ring 760 affords the ability to removeably secure a section of intestine to the spigot 140 through the washing section.

As can be seen in FIG. 7C, the handle 764 of the retainer arm 740 may be curved away from the body 768, such that the only portion of the retainer arm 740 engaging the body is the clamping ring 760.

Figure 8A:
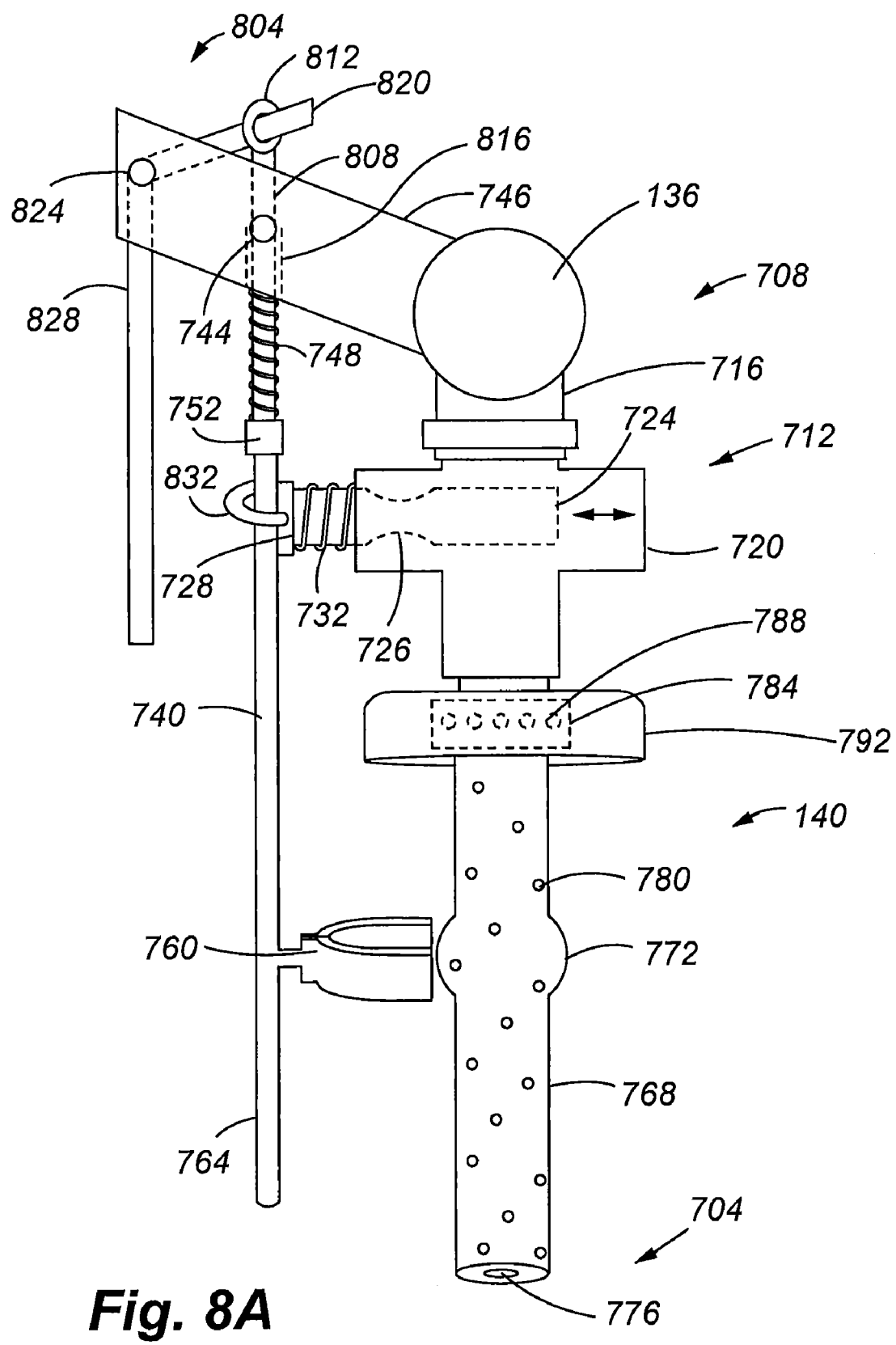
FIG. 8A is a side view of an alternative spigot in a first configuration in accordance with certain embodiments of the present invention.
Figure 8B:
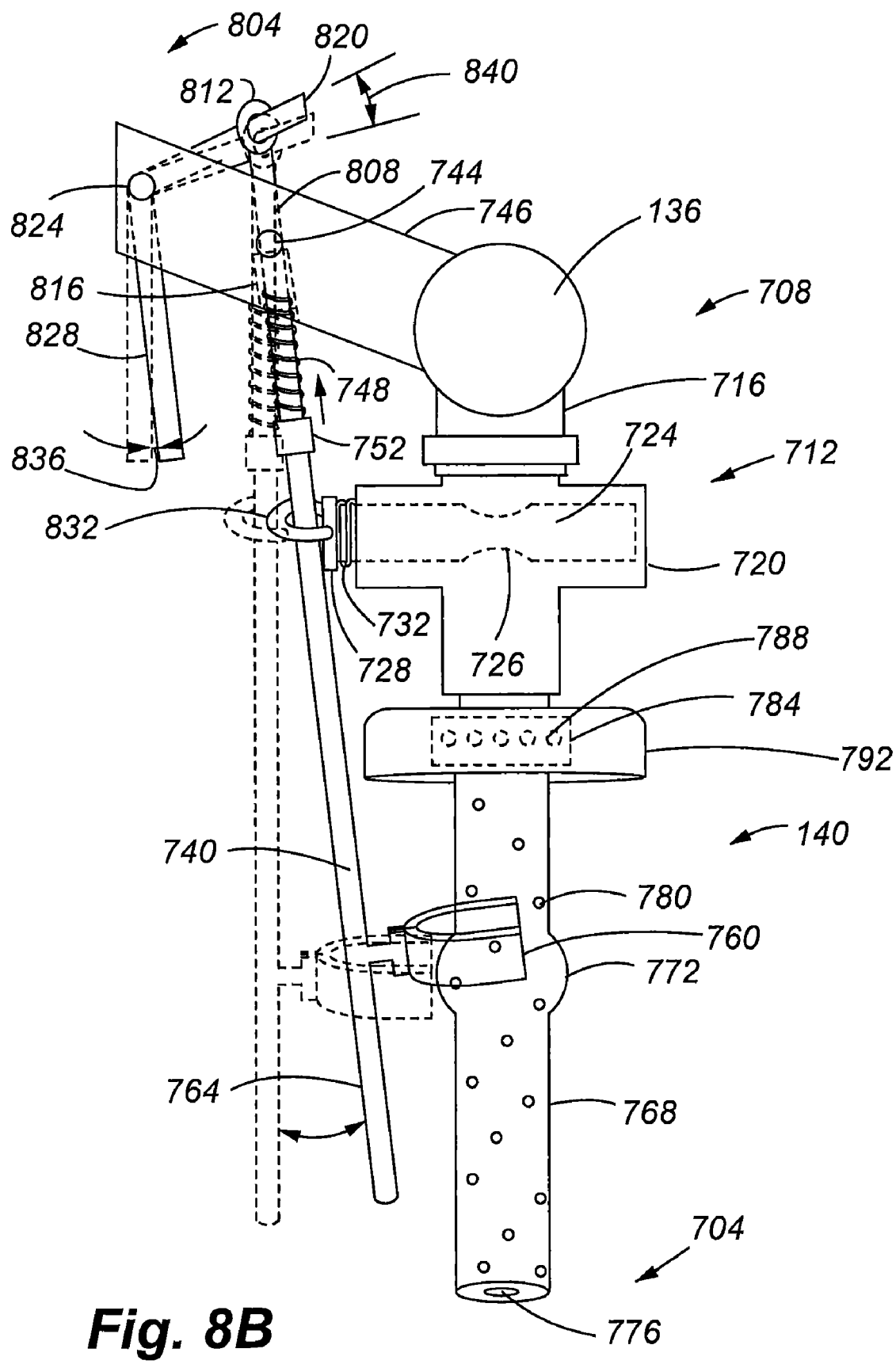
FIG. 8B is a side view of an alternative spigot in a second configuration in accordance with certain embodiments of the present invention.
Figure 8C:
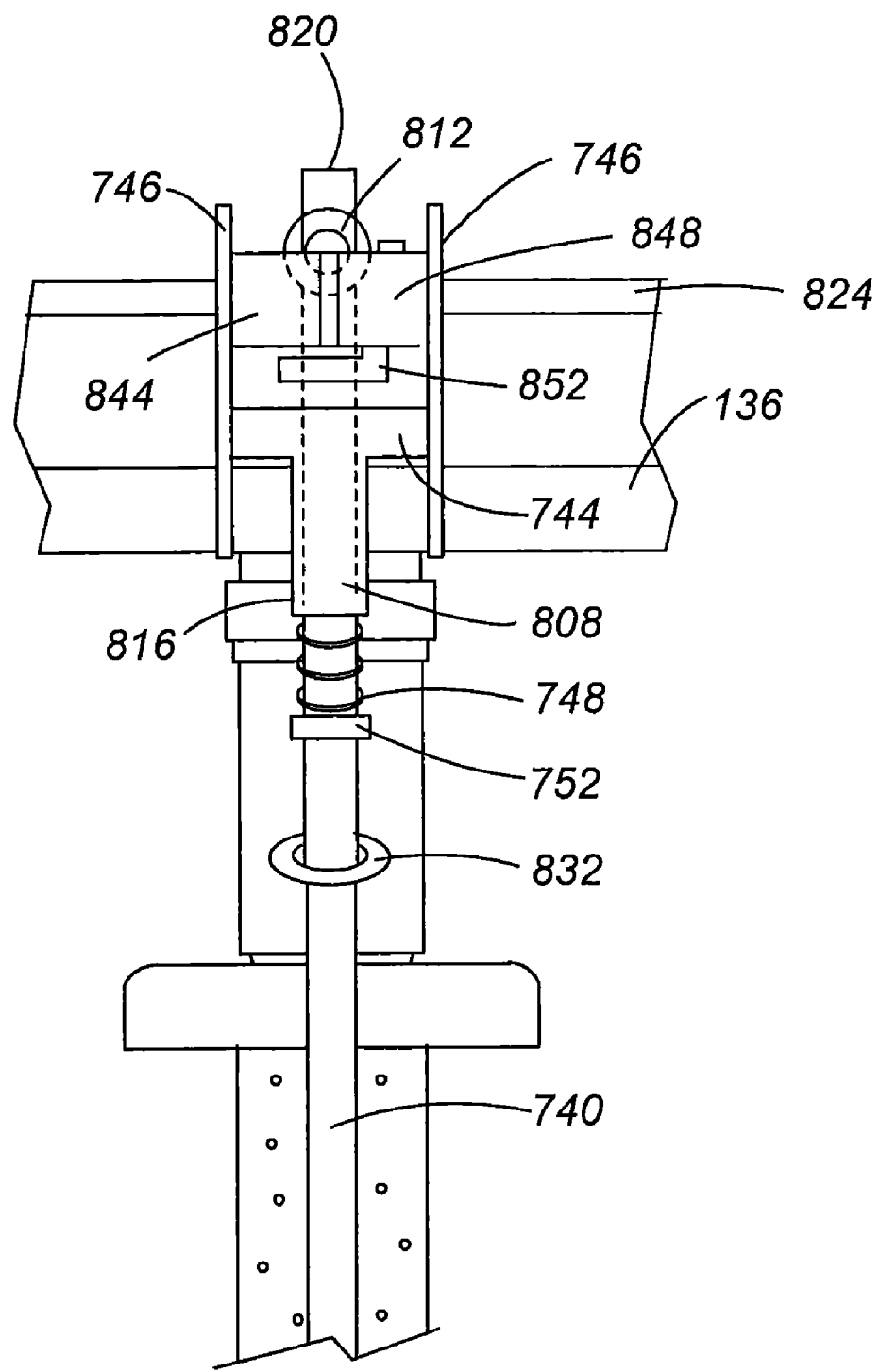
FIG. 8C is a rear view of an alternative spigot in accordance with certain embodiments of the present invention.

FIGS. 8A-C, depict an alternative embodiment of the spigot 140 and retainer arm 740 in accordance with at least some embodiments of the present invention. Referring initially to FIGS. 8A and 8B, the spigot 140 may be configured similarly to the spigot 140 described in connection whereas the actuation of the retainer arm 740 may slightly different. In accordance with at least some embodiments of the present invention, the retainer arm 740 may be manipulated via a dual pivot system, such as the actuation assembly 804 depicted. The actuation assembly 804 may comprise a bar 808 that is operatively connected to a washer 812 or the like. In one embodiment, the bar 808 may be an extension of the retainer arm 740. The retainer arm 740 may extend through the spring 748 and also through the pivot point 744. The retainer arm 740 may be received by a sleeve 816 that acts as an interface with the spring 748. The sleeve 816 may also pivot about pivot point 744 and further be capable of movement along its longitudinal axis to load the spring 748 and move the clamping ring 760 into position around the bulge 772.

The washer 812 may receive a post 820 that resides within the washer 812 without being fixed thereto. The post 820 may be adapted to pivot about a second pivot point 824, which is generally parallel to pivot point 744. In other words, both the pivot point 744 and second pivot point 824 comprise parallel but offset axes of rotation that are generally directly into and out of the figure (i.e., parallel to the flushing arm 136). In accordance with certain embodiments of the present invention, the post 820 is allowed to swing freely between its first and second positions (i.e., positions corresponding to engagement and disengagement of the clamping ring 760). Each spigot 140 on a flushing arm 136 may comprise its own post 820, washer 812, bar 808, and sleeve 816. Accordingly, the post 820 associated with each spigot 140 may be adapted to swing independent of other posts 820, such that the clamping rings 760 of each spigot 140 are able to be engaged at different times. However, a common release arm 828 may be provided that can simultaneously disengage all clamping rings 760 by simultaneously engaging all posts 820. When the common release arm 828 may be connected to all spigots 140 via the pivot point 824, which in accordance with certain embodiments of the present invention may comprise a rod connecting pivot points 824 of each spigot 140. The common release arm 828, upon actuation, may engage all posts 820 such that each post 820 pushes down upon its respective bar 808. The force of the post 820 upon the bar 808 increases the force on the retainer arm 740 to a point that the clamping ring 760 releases from the bulge 772 and the bias force of the spring 748 causes the retainer arm 740 to go back to its original position.

The washer 812 is provided to ensure that the post 820 maintains an operative association with the bar 808, such that movement of the post 820 translates to movement of the bar 808 and vice versa. Therefore, when the retainer bar 740 is moved into a position where the clamping ring 760 is engaging the bulge 772, the post 820 rotates about arrow 840 due to the upward movement of the retainer bar 740 and bar 808. Additionally, the release arm 828 may swing about the second pivot point 824 in the direction of arrow 836. As the flushing arm 136 rotates about the rotating assembly 104, the release arm 828 may engage the trip lever 150 (which may be located on the intestine washing machine 100 itself) and force the clamping ring 760 to release an intestine section from the spigot 140.

A second washer 832 or movement restriction device may also be provided at the interface of the retainer arm 740 and the plug 724. The second washer 832 may be fixed to the plug 724 and may allow the retainer arm 740 to move transversely there through. However, the second washer 832 may translate the swinging movement of the retainer arm 740 into movement of the plug 724. In other words, the second washer 832 may be provided to ensure an operational association between the retainer arm 740 and the plug 724.

Referring now to FIG. 8C, the configuration of the actuation assembly 804 can be seen from a rear view of the flushing arm 136. As noted above the second pivot point 824 may comprise a rod that extends to all spigots 140 on a flushing arm 136. The rod corresponding to the second pivot point 824 may be operatively associated with a first ring 844 and second ring 848. The first ring 844 may be the ring connected to the post 820, which is located in the washer 812. As can be seen in FIG. 8C, the post 808 extends through the sleeve 816 and the first pivot point 744 through the washer 812.

The first ring 844 may be able to rotate freely about the post associated with the second pivot point 824. By allowing the first ring 844 to rotate freely about the post, the retainer arm 740 of each spigot 140 may be capable of independent operation. However, when the retainer arm 740 is moved into an engaged position (e.g., a position where the clamping ring 760 is engaged with the bulge 772), the post 820 may be moved closer to an arm 852 that is connected to the second ring 848. The second ring 848 may be connected to the post associated with the pivot point 824 such that rotation of the post induces rotation of the second ring 848. Rotation of the second ring 848 may further precipitate rotation of the arm 852. As the arm 852 rotates it may engage the post 820 and apply a force to the bar 808 thereby inducing the clamping ring 760 to disengage the bulge 772. Accordingly, the second ring 848 may be used to coordinate the disengagement of all clamping rings 760 from its respective spigot 140, whereas the first ring 844 may allow the independent engagement of clamping rings 760 with its respective spigot 140.

Figure 9:
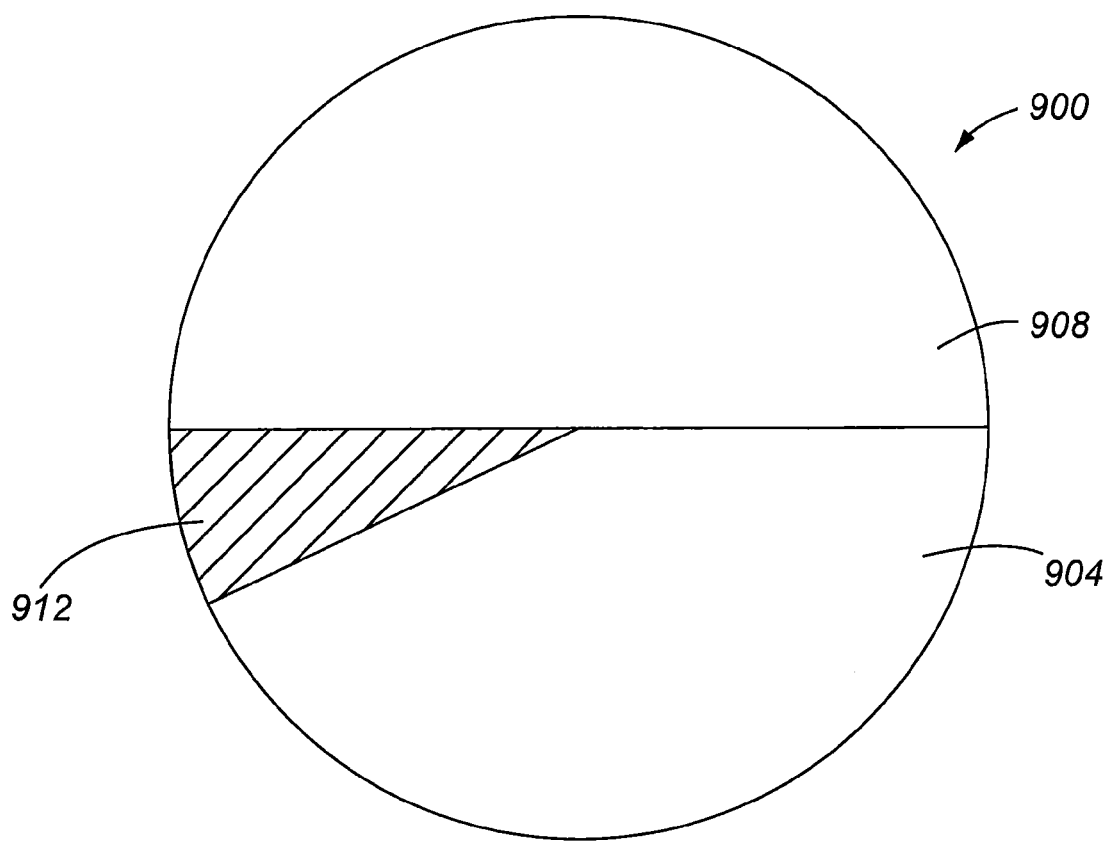
FIG. 9 is a top view of various working sections related to the intestine washing machine in accordance with certain embodiments of the present invention.

With reference to FIG. 9, various sections of the washing machine 100 will be described in accordance with at least some embodiments of the present invention. As viewed from above the working area 900 around the washing machine 100 may be regarded as a circular region. The working area 900 around the machine 100 may be partitioned into a number of sections, where each section corresponds to a different type of action. In accordance with one embodiment of the present invention, the working area 900 may be divided into a loading section 904, a washing section 908, and an unloading section 912. In the depicted embodiment, the loading section 904 comprises the area from about eight o'clock to about three o'clock, the washing section 908 comprises the area from about three o'clock to about nine o'clock, and the unloading section 912 comprise the area from about nine o'clock to about eight o'clock. As noted above, however, the sections do not necessarily need to be mutually exclusive but collectively exhaustive of the entire area 900. For example, the unloading section 912 may be contained within the washing section 908, or another section may not be dedicated to any type of work and as such may be regarded as an idle section.

At the loading section an operator can load the flushing arms 136 with sections of intestines. More specifically, the operator can place sections of intestines on each spigot 140 of an arm 136 as the arm passes through the washing area 904. In this section the operator may secure the intestine to the spigot 140 by utilizing a hook 722, a retainer ring 728, or by simply stretching the intestine around the spigot 140 and relying on the elasticity of the intestine to hold the intestine to the spigot 140.

After a flushing arm 136 is properly loaded with intestine sections, the flushing arm 136 moves into the washing section 908. The first end 324 of the riser 148 may define the beginning of the washing section 908 where the flush valve 128 is changed from a closed position to an open position. Once the flushing arm 136 moves into the washing section 908 fluid is supplied to the flushing arm 136 and into the attached intestine sections. Dirt and other debris is washed from the intestine sections while the flushing arm 136 remains in the washing section 908. The second end 328 of the riser 148 may define the end of the washing section 908.

When a flushing arm 136 leaves the washing section 908 it may then enter into the unloading section 912. The beginning of the unloading section may correspond to the second end 328 of the riser 148. Alternatively, the beginning of the unloading section may be defined by the location of the trip lever 150. When the trip lever 150 disengages the lever 732 of the retainer ring 728, the retainer ring 728 may release from the spigot 140 thereby releasing the intestine from the spigot 140. The intestine section may then either fall under the force of gravity or be pulled off of the spigot 140 and placed into a catch bin or a conveyor that moves the washed section to the next stage of the production process.

One common food product made from animal intestines is "chitterlings," which are made from hog intestines. Many devices for cleaning chitterlings are known in the prior art, including those disclosed in U.S. Pat. No. 3,509,593 to DeMoss and U.S. Pat. No. 5,820,453 to Burke, the entire contents of which are hereby incorporated herein by reference. These devices operate by passing the chitterling over a tubular element having a nozzle for spraying water onto the interior surface to remove a portion of the fecal matter. In commercial cleaning operations, the chitterlings are then commonly slit longitudinally and cleaned further using a centrifugal or agitating washing action. Finally, the chitterlings are then commonly passed through a hand-cleaning and inspection station for further cleaning.

In Hispanic cultures, "tripas" are prepared from the small intestines of slaughtered red-meat animals. In European and Hispanic cultures intestines are used for sausage skin or casing. In both of these applications, the intestines must be properly cleaned such that they are suitable for human consumption. A device for washing tripas is disclosed in U.S. Pat. No. 6,083,096 to Carrillo, the entire contents of which are hereby incorporated herein by reference. Another system for washing intestines is described in U.S. Patent Publication No. 2003/0040267 to Houtz et al, the entire contents of which are hereby incorporated herein by reference.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of washing animal intestines, comprising:
securing at least one intestine section to a spigot provided on a flushing arm, the flushing arm including a plurality of spigots, wherein the at least one intestine section is secured to the spigot such that substantially all of the at least one intestine section hangs freely from the spigot under the force of gravity, and wherein the at least one intestine section hangs freely from the spigot for one substantially complete rotation of the flushing arm;
rotating the flushing arm about a substantially vertical central axis of a rotating fluid tank as the at least one intestine section hangs freely from the spigot;
receiving fluid under pressurized conditions at the flushing arm from the rotating fluid tank; and
causing the fluid to issue under pressure from the flushing arm to wash the at least one intestine section secured thereto.

2. The method of claim 1, further comprising:
continuing to rotate the flushing arm about the central axis of the fluid tank until the flushing arm enters an unloading section;
stopping the flow of fluid from the flushing arm; and
releasing the at least one intestine section from the flushing arm.

3. The method of claim 2, further comprising:

continuing to rotate the flushing arm about the central axis of the fluid tank until the flushing arm enters a loading section; and securing a new at least one intestine section to the flushing arm.

4. The method of claim 1, wherein the at least one intestine section comprises a length between about 1 ft and about 8 ft.

5. The method of claim 1, wherein the flushing arm comprises a plurality of spigots spaced across the flushing arm, wherein the spigots are adapted to issue fluid in a generally downward direction during the entire rotation of the flushing arm and wherein a first of the at least one intestine section is in fluid communication with a first of the plurality of spigots and a second of the at least one intestine section is in fluid communication with a second of the plurality of spigots.

6. The method of claim 1, further comprising adjusting the rotation rate of the fluid tank.

7. A device for washing at least a portion of animal intestine using a cleaning fluid, comprising:

a fluid supply line;

a rotating fluid tank fluidically connected to the fluid supply line and adapted to rotate about the fluid supply line; and two or more flushing arms fluidically connected to the rotating fluid tank and operable to rotate about a substantially vertical axis of the rotating fluid tank, wherein at least one of the two or more flushing arms comprises two or more spigots adapted to receive a section of animal intestine, wherein the section of animal intestine is secured to the at least one of the two or more spigots such that substantially all of the section of animal intestine hangs freely from the two or more spigots under the force of gravity while the rotating fluid tank is rotated, and wherein the section of animal intestine hangs freely from the two or more spigots for one substantially complete rotation of the flushing arm.

8. The device of claim 7, wherein the rotating fluid tank is further adapted to store cleaning fluid at a predetermined pressure and selectively supply the cleaning fluid to a first of the two or more flushing arms while not supplying the cleaning fluid to a second of the two or more flushing arms.

9. The device of claim 7, further comprising:

a flush valve between the first flushing arm and fluid tank; and a valve controller adapted to change the flush valve from an open state to a closed state and vice versa.

10. The device of claim 9, wherein the valve controller comprises at least one of a mechanical, electromechanical, and electrical controller.

11. The device of claim 9, wherein the valve controller comprises a lever pivotally connected to the flush valve and operable to pivot between a first position and a second position, wherein when the lever is in a first position the flush valve is in a first state and when the lever is in a second position the flush valve is in a second state.

12. The device of claim 11, further comprising:

a platform adapted to allow the fluid supply line pass therethrough and about which the lever is able to rest on; and a riser adjacent to the platform and adapted to cause the lever to change from the first position to the second position.

13. The device of claim 12, wherein the riser substantially defines a washing section.

14. The device of claim 7, wherein a section of animal intestine is secured to a spigot of a first of the two or more flushing arms, and wherein the device further comprises a trip lever operable to cause the section of animal intestine to become unsecured from the first flushing arm.

15. The device of claim 7, wherein the two or more spigots are fluidically connected to the at least one flushing arm, and wherein the two or more spigots are adapted to provide cleaning fluid to at least one of the interior and exterior of a section of animal intestine.

16. The device of claim 7, wherein the fluid tank rotates about a substantially vertical axis.

17. The device of claim 7, wherein the two or more flushing arms are substantially horizontal, and wherein the two or more spigots are adapted to spray the cleaning fluid in a substantially vertically downward direction.

18. A device for cleaning a portion of an animal intestine, comprising:

means for holding the portion of animal intestine such that substantially all of the portion of animal intestine hangs freely from the means for holding;

means for rotating the animal intestine about a substantially vertical axis as the at least a portion of animal intestine hangs freely from the means for holding, wherein the portion of animal intestine hangs freely from the means for holding for one substantially complete rotation of the means for rotating, and wherein the means for rotating further comprises a means for storing cleaning fluid;

means for supplying cleaning fluid to the means for storing cleaning fluid; and means for controlling the flow of cleaning fluid to the means for holding, wherein the means for controlling the flow of cleaning fluid comprises a plurality of means for holding.

19. The device of claim 18, wherein the means for rotating causes the means for holding to move though a loading section, a washing section, and an unloading section.

20. The device of claim 19, wherein the means for controlling permits the cleaning fluid to flow from the means for storing to the means for holding while the means for holding is in the washing section and wherein the means for controlling restricts the cleaning fluid from flowing from the means for storing to the means for holding while the means for holding is in the loading section.

21. The device of claim 18, wherein the portion of animal intestine comprises an intestine segment from at least one of a bovine, porcine, and ovine type of animal.

22. The device of claim 18, further comprising means for adjusting the speed of rotation of the means for rotating.

* * * * *